(12) United States Patent
Reumann et al.

(10) Patent No.: US 9,143,520 B2
(45) Date of Patent: Sep. 22, 2015

(54) METHOD AND APPARATUS FOR COMPUTER NETWORK SECURITY

(75) Inventors: John Reumann, Croton on Hudson, NY (US); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/123,084

(22) Filed: May 19, 2008

(65) Prior Publication Data

US 2008/0222704 A1    Sep. 11, 2008

Related U.S. Application Data

(63) Continuation of application No. 11/505,223, filed on Aug. 16, 2006, now abandoned.

(51) Int. Cl.
*G06F 21/00* (2013.01)
*H04L 29/06* (2006.01)
*H04L 12/28* (2006.01)
*H04J 3/16* (2006.01)

(52) U.S. Cl.
CPC ........ *H04L 63/1425* (2013.01); *H04L 63/0815* (2013.01); *H04L 63/0876* (2013.01)

(58) Field of Classification Search
CPC ............ H04L 63/1425; H04L 63/0815; H04L 63/0876
USPC ...................... 726/15, 28, 9; 713/182; 714/38
See application file for complete search history.

(56) References Cited

U.S. PATENT DOCUMENTS

| 4,468,809 | A | 8/1984 | Grabowski et al. |
| 6,813,645 | B1 | 11/2004 | Meyer |
| 7,290,288 | B2 * | 10/2007 | Gregg et al. ................... 726/28 |
| 2002/0143814 | A1 | 10/2002 | Hepworth et al. |
| 2003/0053420 | A1 | 3/2003 | Duckett et al. |
| 2005/0055555 | A1 * | 3/2005 | Rao et al. ..................... 713/182 |
| 2006/0259819 | A1 * | 11/2006 | Connor ........................ 714/38 |

FOREIGN PATENT DOCUMENTS

WO    WO 2005112317 A2 * 11/2005

OTHER PUBLICATIONS

Leon Pan; "A Unified Network Security and Fine-Grained Database Access Control Model"; Electronic Commerce and Security, 2009. ISECS '09. Second International Symposium on vol. 1; DOI: 10.1109/ISECS.2009.191; Publication Year: Sep. 2009; pp. 265-269.*
Netcraft Anti-Phishing Toolbar; http://toolbar.netcraft.com.
Oracle E-Business Suite Technology. In-Depth: Using Single Sign-On 10g with E-Business Suite Release 11i by Steven Chan, dated May 2, 2006; http://blogs oracle.com/schan/2006/02.

(Continued)

*Primary Examiner* — Andrew Nalven
*Assistant Examiner* — Courtney Fields
(74) *Attorney, Agent, or Firm* — Preston J. Young; Ryan, Mason & Lewis, LLP

(57) ABSTRACT

Techniques are provided for computer network security. The techniques include obtaining operational data for at least a first networked application; obtaining enterprise data for at least a second networked application; correlating the operational data with the enterprise data to obtain correlated data; and using the correlated data to improve security of the computer network.

19 Claims, 4 Drawing Sheets

(56) References Cited

OTHER PUBLICATIONS

U.S. Appl. No. 11/623,516, filed Jan. 16, 2007.
Phishing—Wikipedia, the free encyclopedia, downloaded from website http://en.wikipedia.org/wiki/Phishing on Jan. 8, 2007.
"Microsoft Adds Anti-phishing Tools to IE 7" by Matt Hines, Sep. 5, 2006; downloaded from http://www eweek.com/article2/0,1895,2012237,00.asp on Jan. 8, 2007.
"Firefox 2.0 Bakes in Anti-Phish Antidote" by Sean Michael Kerner, May 30, 2006; downloaded from http://www internetnews com/dev-news/article php/3609816 on Jan. 8, 2007.
"Protect Against Internet Phishing Scams", downloaded from http://www.phishguard.com/ on Jan. 8, 2007.
Anti-Phishing Working Group; Website Hosting Courtesy GeoTrust; Resources; downloaded from http://www.antiphishing org/solutions.html on Jan. 8, 2007.
CallingID Toolbar download and review—anti-phishing browser add-on from SnapFiles; http://www.snapfiles com/get/callingid.html on Jan. 8, 2007.
NetGeo—The Internet Geographic Database; downloaded from http://www.caida.org/tools/utilities/netgeo/ on Jan. 8, 2007.

\* cited by examiner

400

METHOD AND APPARATUS FOR COMPUTER NETWORK SECURITY

CROSS-REFERENCE TO RELATED APPLICATIONS

This application is a continuation of U.S. patent application Ser. No. 11/505,223, filed Aug. 16, 2006, now abandoned, incorporated by reference herein.

FIELD OF THE INVENTION

The present invention generally relates to information technology, and, more particularly, to a method and apparatus for computer network security.

BACKGROUND OF THE INVENTION

In current enterprises and systems, each user has many user-names and passwords. Single sign-on systems are currently developed and deployed which require the user to know only a single user-ID and password to access the enterprise systems. However, since several sites may require such a password protection, it is cumbersome for the user to type the same password at multiple sites.

The current state of the art for enabling users to access the network typically requires the use of an access-point for the user laptop to connect to the enterprise network. The access point could be the wireless access point if the user is accessing a local 802.1x network of the user, a virtual private network (VPN) gateway if the user is dialing into the VPN server of an enterprise, the first router on the path of a physical network connecting the user to the enterprise network etc. Typically, the access-point would have a mechanism to authenticate the user device to the network, for example 802.1x access would require a Wired Equivalent Privacy (WEP) password, or a Lightweight Extensible Authentication Protocol (LEAP) user-ID and password. VPN gateway access would require a user-issued certificate or user-ID and password information, wired access may require Remote Authentication Dial-In User Service (RADIUS) authentication with a user-ID and password or other credentials. The user-ID and password is the key to associating an identity with the user. Currently, the credentials used in the wireless access point authentication cannot be shared with other applications running in the enterprise.

Current solutions for asset notification usually do not send notification before disconnecting a user. Also, such solutions generally have out of date information, or use mechanisms that are not accessible when the machine is disconnected.

It would thus be desirable to over come the limitations in previous approaches.

SUMMARY OF THE INVENTION

Principles of the present invention provide techniques for computer network security. An exemplary method (which can be computer-implemented) for computer network security, according to one aspect of the invention, can include steps of obtaining operational data for at least one networked application; obtaining enterprise data for at least one networked application; correlating the operational data with the enterprise data to obtain correlated data; and using the correlated data to improve security of the computer network.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, providing an approach which obviates the need for a user to remember an explicit password and user-ID, but still allows a user to access distributed applications of a network that implements existing security authentication mechanisms. Also, one or more embodiments of the invention may provide the beneficial effect of notifying owners of assets in an enterprise which are disconnected from the enterprise network due to security or other policy violations via non-network mechanisms so that the owners are aware of the assets being disconnected.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Computer networks typically contain several types of data; exemplary embodiments of the invention deal with two types of data, namely, "operational data" and "enterprise data" Operational data may be defined as data that is generated during the normal course of operation of a computer network. Operational data may also be defined as data that is generated by systems and applications during the normal course of their operation. Examples of operational data include logs generated by network access devices, logs generated by network applications, fields such as identity of remote connections maintained during the operation of network protocols, and the like. Enterprise data may be defined as data that is maintained for user-accounting, billing, record-keeping and other administrative aspects of an enterprise. Enterprise data may also be defined as information that is available within an enterprise and/or user which provides records about aspects of a user which are independent of the operation and/or normal usage of the system. Enterprise data includes, for example, information such as the employee directory of an organization, a database of computers owned by an employee, a record of customers and their postal addresses, and the like. In existing computer security applications, operational data and enterprise data are treated as independent entities. In one or more embodiments of the invention, techniques are provided for correlating the information available in operational data and that of enterprise data to build new security mechanisms.

Security mechanisms that leverage both enterprise and operational data may advantageously enable many security methods which are hard to achieve using existing systems.

Figure 1:
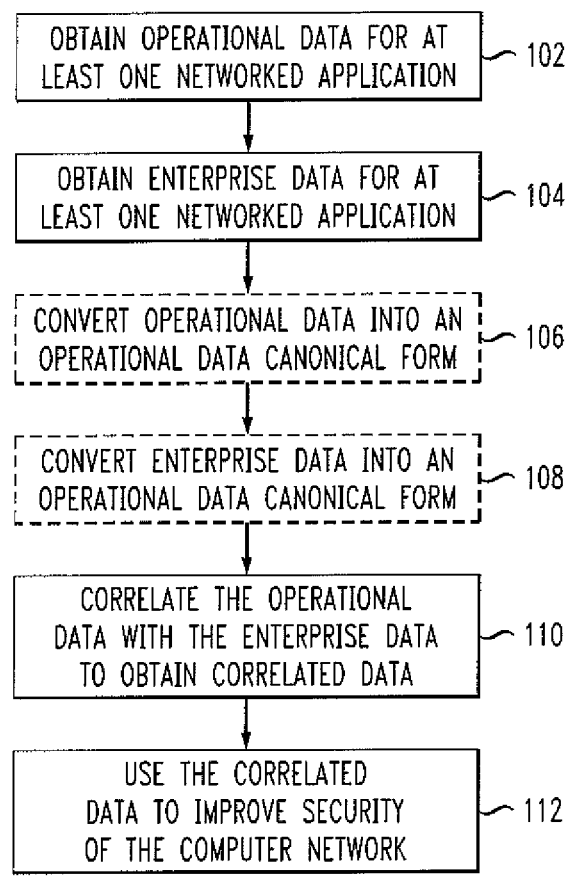
FIG. 1 is a flow diagram illustrating a method for improving security in a computer network, according to one embodiment of the invention.

FIG. 1 shows a flow diagram illustrating a method for improving security in a computer network, according to one embodiment of the invention. Step 102 includes obtaining operational data for at least a first networked application. Step 104 includes obtaining enterprise data for at least a second networked application. The first and second networked applications can be the same or different. Step 110 includes correlating the operational data with the enterprise data to obtain correlated data. Step 112 includes using the correlated data to improve security of the computer network. Optionally, the method illustrated in FIG. 1 can also include step 106, converting operational data into an operational data canonical form, and step 108, converting enterprise data into an enterprise data canonical form.

In one embodiment of the invention, the method for improving security in a computer network includes correlating operational data (for example logs from networked systems and applications), and enterprise data (for example enterprise directory, user account records, etc.) within an enterprise to maintain a continuous mapping from network identifiers (for example certificates, Internet Protocol (IP) addresses, etc.) to the owning individual (user name, corporation name). This mapping is then leveraged to build one or more of the applications.

This embodiment of the invention employs a system that correlates two types of data: operational data and enterprise data. By way of example and not limitation, instances of operational data include logs that are generated by several systems, for example dynamic host configuration protocol (DHCP) server logs, domain name system (DNS) server logs, web-server logs, as well as pieces of information that are required to be known to any application in order for it to complete its communication, for example IP addresses, uniform resource locators (URLs) being accessed, and domain names of sites one is connecting to. Examples of enterprise data include organization charts and/or enterprise directories in corporations, billing records, and user account databases.

In one embodiment, the operational and enterprise data are correlated within a single administrative domain by way of a system herein referred to as the Security Information Server (SIS). The Security Information Server obtains the different types of operational data (for example logs, DNS records, etc.) from all the different appropriate devices within the network. The Security Information Server converts each type of operational data into an operational data canonical form. Canonical form may be defined as a standard or common representation of data. Canonical form may also be defined as an application-independent representation of data in the case, for example, where such data is itself in multiple application-specific formats.

Similarly, the Security Information Server obtains the different types of enterprise data from the various applications within the network and converts each type of enterprise data to an enterprise data canonical form. The Security Information Server then correlates the enterprise data with the operational data that is within the network. The SIS now has the ability to take a specific piece of operational data (for example an IP address or URL), and is able to provide the enterprise level data (for example user name, or user address) about the entity which has that IP address or URL. These capabilities of the SIS, which can be provided by way of a web-service or other remote invocation, can be used to identify in real-time the entity with which a machine has an ongoing communication.

Several computer forensics applications can also be performed by manual observation and correlation of the operational data and enterprise data within an organization. One or more embodiments of the invention may create several new security applications, and provide real-time crime prevention as a result of having a system that provides operational and enterprise data in canonical format, and correlates the two types of data.

Figure 2:
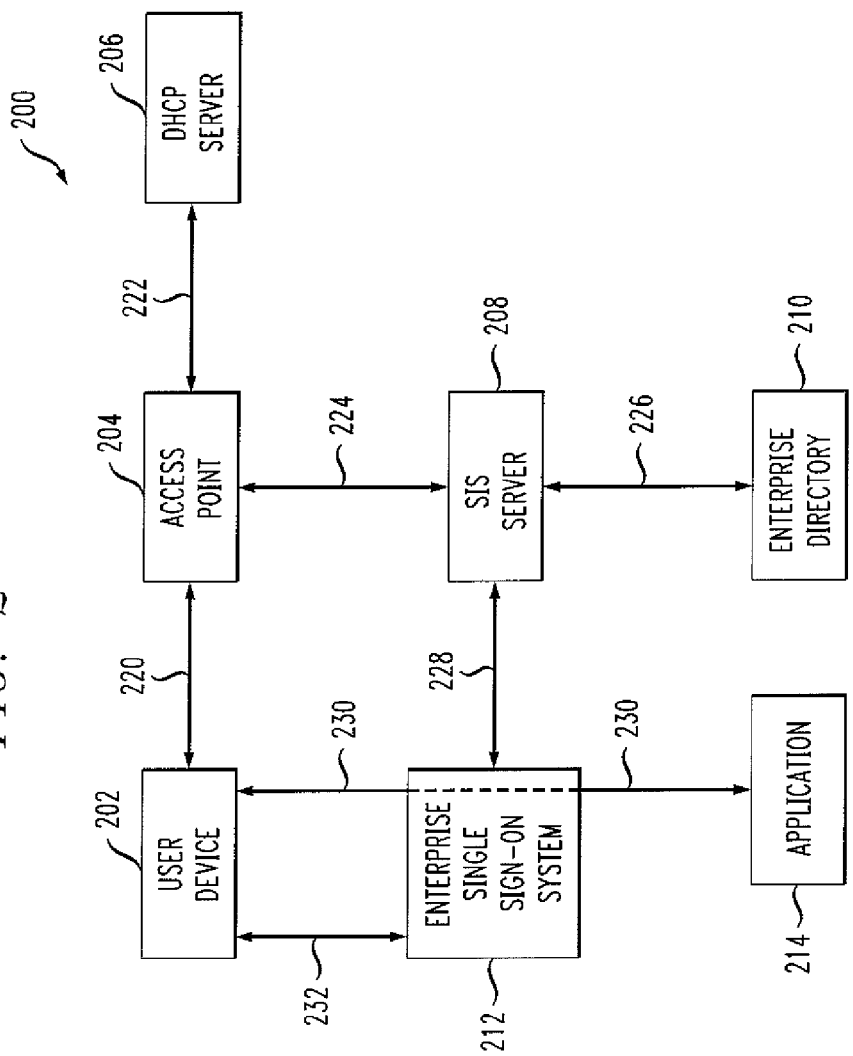
FIG. 2 is a block diagram illustrating a method for improving security in a computer network, according to one embodiment of the invention.

FIG. 2 shows a block diagram illustrating a method for improving security in a computer network, according to one embodiment of the invention. The system 200 comprises components including a user device 202 attempting to access the computer network, an access point 204, a Security Information Server 208, an enterprise directory 210, an enterprise single sign-on system 212, an application 214, and also the system may contain a DHCP server 206. The system 200 also comprises method steps depicted by the enumerated arrows, as described below.

In step 220, the user device 202 inputs information, such as a user-ID and password, to the access point 204. In step 222, the access point 204 provides the user device 202 with operational data such as a unique address via a DHCP server 206. Subsequently, in step 224, the access point 204 provides credentials used by the user device 202 and the assigned unique address to the SIS 208. The SIS 208, in step 226, uses the information contained in the credentials to access an enterprise directory 210 and map the information to a user within the enterprise. In step 228, the SIS 208 provides user information and the currently assigned DHCP address of the user to an enterprise single sign-on system 212. The single sign-on system 212 uses the unique address as an alias for the user and provides single sign-on ability from the user device 202 to an application 214 via step 230. Optionally, the illustrated method also includes step 232, eliminating the single sign-on ability of the user when the user disconnects from the computer network.

According to this embodiment, operational data can comprise a record of a unique address allocation to a user device attempting to access the computer network, and enterprise data can comprise credentials associated with local authentication at the user device. Also, the step of correlating the operational data with the enterprise data to obtain correlated data comprises associating the unique address and credentials with the authentication information stored in a single-sign-on server. The step of using the correlated data to improve security of the computer network comprises providing a user of the user device with single sign-on ability responsive to an indication of an appropriate match between the unique address and credentials and the authentication information.

The unique address can include, by way of example and not limitation, an IP address, and the credentials can include, by way of example and not limitation, biometric credentials.

The user-ID and password that is used by a network to authenticate machines to allow access to the enterprise network via DHCP is correlated with the owning user and/or employee and/or customer, and is then used to provide access to other password-protected systems within the enterprise network.

In another embodiment of the invention, the method illustrated in FIG. 2 comprises the additional step of eliminating the single sign-on ability of the user when the user disconnects from the computer network. When the user disconnects from the enterprise system, the mapping of the IP address to the user is eliminated from the single sign-on mechanism.

As illustrated in FIG. 2, one embodiment of the invention in conjunction with biometric oriented approaches provides a solution that does not require a user to remember any passwords.

A user can access an application without typing a password even though the application is implemented so as to secure access by way of a user-ID and password, or other credentials. In another embodiment, the user connects to the network of the enterprise using a desktop and/or laptop which has a biometric or other form of identification which ensure that only a properly authorized user can access and use the computer. Also, the same mechanism can be used for other devices such as, by way of example and not limitation, desktop computers, personal digital assistants (PDAs), cellphones, and other devices which access the enterprise network using the Internet Protocol.

The SIS uses the information contained in the credentials to access an enterprise directory (i.e. enterprise data) and map it to a user within the enterprise. By way of example and not limitation, the SIS can use the enterprise's intranet user-ID contained in the LEAP wireless authentication to determine the e-mail ID, serial number, and other identifying information of the user from a corporate on-line directory.

The single sign-on system or SIS may implement additional mechanisms to provide added security to the above solution. By way of example and not limitation, the single sign-on system may trace-back packets to clients to ensure that no one is trying to hijack or use an IP addressed assigned to a different user. Note that the SIS can immediately determine the enterprise identity of owners of the masquerading machines (which need access to the network through DHCP server or otherwise) and block their network access, or take other action such as notifying the owners of these machines. Other network security mechanisms may also be enforced to improve the security of the computer network (for example the access-point will only allow packets from machines whose media access control (MAC) address and IP address have been issued by the DHCP server).

Figure 3:
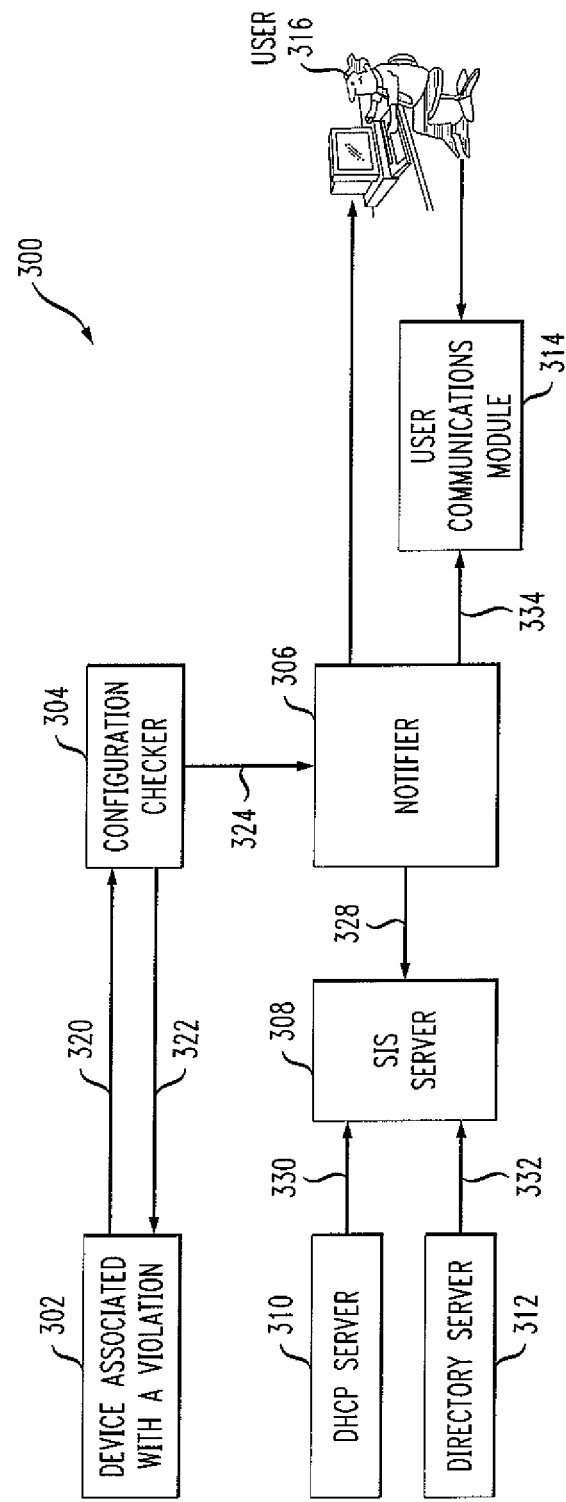
FIG. 3 is a block diagram illustrating a method for improving security in a computer network, according to one embodiment of the invention.

FIG. 3 shows a block diagram illustrating a method for improving security in a computer network, according to one embodiment of the invention. The system 300 contains a device associated with a violation 302, a configuration checker 304, a notifier 306, a Security Information Server 308, a DHCP server 310, a directory server 312, and a user communications module 314. The system 300 performs method steps depicted by the enumerated arrows, as described below.

In step 320, a device associated with a violation 302 attempts DHCP access to a local-area network (LAN). In step 322, the configuration checker 304 checks the configuration of the device 302, obtains indication of a violation within the computer network, and terminates access to the network for the device 302. In step 324, the configuration checker 304 informs the notifier 306 of the violation. Also, DHCP server 310 sends operational data to the SIS 308 via step 330, and a directory server 312 sends enterprise data to the SIS 308 via step 332, at which point the notifier 306 determines the identity of the user of the device 302 from the SS 308 in step 328. In step 334, the notifier 306, using the correlated data from the SIS 308, sends to the user communication module 314 notification to the user 316 that access to the computer network has been terminated. The notification to the user may be provided in a variety of ways. One possible mechanism for notifying the user would be to use the notifier 306 to place a computer generated telephone call to the user. One approach that can be used to place a computer generated telephone call is to use a computer communication protocol like the Session Initiation Protocol (SIP).

The violation associated with the device 302 can include, by way of example and not limitation, a virus, a security violation, and improper software. The user communications module 314 can include, by way of example and not limitation, a module capable for sending and/or receiving a telephone message, email, FAX, or pager message.

This embodiment of the invention provides a timely notification, and does not rely on network connectivity to be present to the user being notified. The owner and/or user of a security asset is identified from the correlated information and the owner's entry in an organization directory and/or account information is used to identify and notify the person, for example, via a telephone message, email, FAX, or pager message.

A security management server is capable of tracking the configuration and/or other properties of a device and terminating the network access of a device which violates the specified guidelines. Such management applications and servers exist in the current state of the art, but usually disconnect devices silently without any notification to the user.

The SIS server in the enterprise uses the authentication information used for accessing the access link within the enterprise environments to look up the enterprise directory, and to identify the user of a machine accessing the network. The enterprise directory can be used to look up email, telephone number, FAX number, pager number and other ways to reach the user. When an indication of a violation on a device is obtained, and the system decides to terminate the access of the device to the network, a voice-over-internet protocol (VoIP) server attached to the security management server notifies the user by phone, pager or FAX that the access of a specific machine to the network has been disconnected.

The combination of operational and enterprise data can be used for many other functions within the network to improve security. These include, by way of example and not limitation, actions such as an improved tracking of devices that are infected by viruses, and automatic notification to corresponding employees by an enterprise, as well as automatic notification of virus infection in customer computers by internet service providers (ISPs).

In another embodiment of the invention, the SIS provides improved tracking of owners of sites that are at the other end of a connection with the network (Anti-Phishing toolbars). This allows for better accounting and user chargeback on the basis of metrics such as, for example, which user is accessing a specific network in an enterprise.

According to this embodiment, operational data comprises an IP address of a remote party of a connection with the computer network, and a domain name associated with the IP address, and enterprise data comprises user registration information maintained by a provider of network connectivity to the remote party of the connection.

The step of correlating operational data with enterprise data to obtain correlated data comprises checking that the domain name displayed to a local party of the connection matches the user registration information. Also, the step of using the correlated data to improve security of the computer network comprises displaying an alert to the local party of the connection based on an outcome of the correlating step. The connection can also comprise an HTTP protocol Internet connection.

In one or more inventive embodiments, the technique of correlating operational data and enterprise data can be used to create many different security solutions, and three such solutions have been described above. This combination, in other contexts, can enable several other security solutions.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 4:
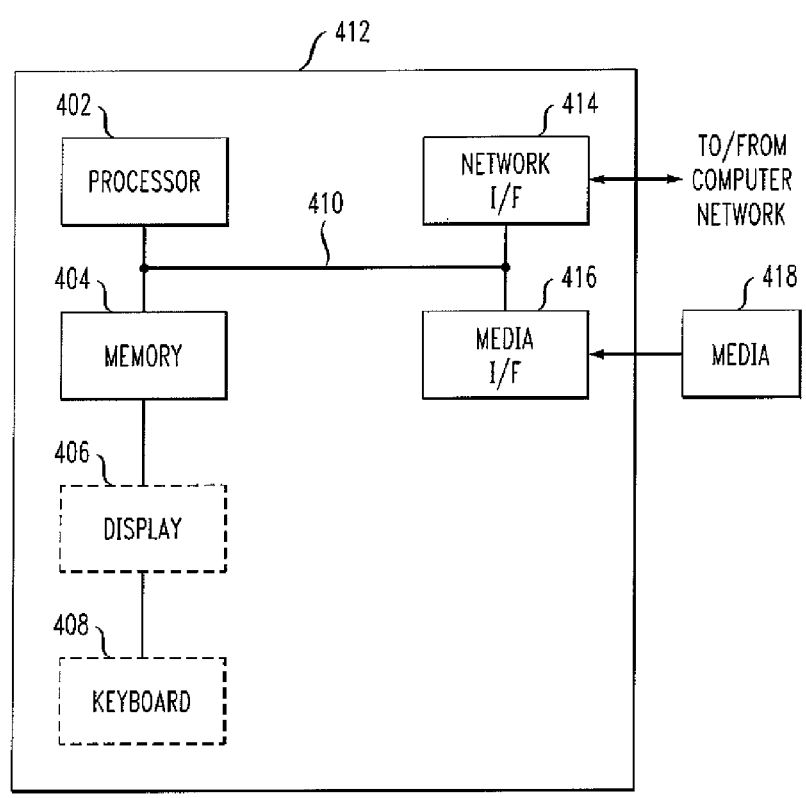
FIG. 4 is a system diagram of an exemplary computer system on which one or more embodiments of the present invention can be implemented.

One implementation of the present invention makes substantial use of software running on a general purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory (for example memory 404), magnetic tape, a removable computer diskette (for example media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for improving security in a computer network, comprising the steps of:
    obtaining operational data for at least a first networked application, wherein said operational data is generated during normal operation of said first networked application;
    obtaining enterprise data for at least a second networked application, wherein said enterprise data is maintained independent of said normal operation of said first networked application;
    correlating said operational data with said enterprise data to obtain correlated data; and
    using said correlated data to improve security of said computer network, wherein:
        said operational data comprises a record of a unique address allocation to a user device attempting to access said computer network;
        said enterprise data comprises credentials associated with local authentication at said user device;
        the step of correlating said operational data with said enterprise data to obtain correlated data comprises associating said unique address and said credentials with authentication information stored in a single-sign-on server; and
        the step of using said correlated data to improve security of said computer network comprises providing a user of said user device with single sign-on ability responsive to an indication of an appropriate match between said unique address and said credentials and said authentication information, wherein one or more steps of said method are performed by a hardware device.

2. The method according to claim 1, wherein said first and second networked applications are the same application.

3. The method according to claim 1, wherein said first and second networked applications are different applications.

4. The method according to claim 1, further comprising the additional step of converting said operational data into an operational data canonical form.

5. The method according to claim 1, further comprising the additional step of converting said enterprise data into an enterprise data canonical form.

6. The method according to claim 1, wherein said unique address comprises an IP address.

7. The method according to claim 1, wherein said credentials comprise biometric credentials.

8. The method according to claim 1, further comprising an additional step of eliminating said single sign-on ability of said user when said user disconnects from said computer network.

9. The method according to claim 1, wherein said step of using the correlated data to improve network security further comprises the steps of:
obtaining indication of a violation within said computer network;
terminating access to said computer network for a device associated with said violation; and
notifying a user of said device that access to said computer network has been terminated, using said correlated data.

10. The method according to claim 9, wherein said violation comprises a virus.

11. The method according to claim 9, wherein said violation comprises a security violation.

12. The method according to claim 9, wherein said violation comprises improper software.

13. A method for improving security in a computer network, comprising the steps of:
obtaining operational data for at least a first networked application, wherein said operational data is generated during normal operation of said first networked application;
obtaining enterprise data for at least a second networked application, wherein said enterprise data is maintained independent of said normal operation of said first networked application;
correlating said operational data with said enterprise data to obtain correlated data; and
using said correlated data to improve security of said computer network, wherein:
said operational data comprises:
an IP address of a remote party of a connection with said computer network; and
a domain name associated with said IP address;
said enterprise data comprises user registration information maintained by a provider of network connectivity to said remote party of said connection;
the step of correlating said operational data with said enterprise data to obtain correlated data comprises checking that said domain name displayed to a local party of said connection matches said user registration information; and
the step of using said correlated data to improve security of said computer network comprises displaying an alert to said local party of said connection based on an outcome of said correlating step, wherein one or more steps of said method are performed by a hardware device.

14. The method according to claim 13 wherein said connection comprises an HTTP protocol Internet connection.

15. An apparatus for improving security in a computer network, comprising:
a memory; and
at least one processor coupled to said memory and operative to:
obtain operational data for at least a first networked application, wherein said operational data is generated during normal operation of said first networked application;
obtain enterprise data for at least a second networked application, wherein said enterprise data is maintained independent of said normal operation of said first networked application;
correlate said operational data with said enterprise data to obtain correlated data; and
use said correlated data to improve security of said computer network,
wherein:
said operational data comprises a record of a unique address allocation to a user device attempting to access said computer network;
said enterprise data comprises credentials associated with local authentication at said user device; and
said at least one processor is further operative to:
correlate said operational data with said enterprise data to obtain correlated data by associating said unique address and said credentials with authentication information stored in a single-sign-on server; and
use said correlated data to improve security of the computer network by providing a user of said user device with single sign-on ability responsive to an indication of an appropriate match between said unique address and said credentials and said authentication information.

16. An apparatus for improving security in a computer network, comprising:
a memory; and
at least one processor coupled to said memory and operative to:
obtain operational data for at least a first networked application, wherein said operational data is generated during normal operation of said first networked application;
obtain enterprise data for at least a second networked application, wherein said enterprise data is maintained independent of said normal operation of said first networked application;
correlate said operational data with said enterprise data to obtain correlated data; and
use said correlated data to improve security of said computer network,
wherein:
said operational data comprises an IP address of a remote party of a connection with said computer network, and a domain name associated with said IP address;
said enterprise data comprises user registration information maintained by a provider of network connectivity to a remote use of an Internet connection; and
said at least one processor is further operative to:
correlate said operational data with said enterprise data to obtain correlated data by checking that said domain name displayed to a local party of said connection matches said user registration information; and use said correlated data to improve security of said computer network by displaying an alert to said local party of said connection based on an outcome of said correlating step.

17. A computer program product comprising a non-transitory computer useable readable recordable medium having computer useable program code for improving security in a computer network, said computer program product including:

computer useable program code for obtaining operational data for at least a first networked application, wherein said operational data is generated during normal operation of said first networked application;

computer useable program code for obtaining enterprise data for at least a second networked application, wherein said enterprise data is maintained independent of said normal operation of said first networked application;

computer useable program code for correlating said operational data with said enterprise data to obtain correlated data; and computer useable program code for using said correlated data to improve security of said computer network, wherein:

said operational data comprises a record of a unique address allocation to a user device attempting to access said computer network;

said enterprise data comprises credentials associated with local authentication at said user device; and said computer program product further includes:

computer useable program code for correlating said operational data with said enterprise data to obtain correlated data by associating said unique address and said credentials with authentication information stored in a single-sign-on server; and computer useable program code for using said correlated data to improve security of said computer network by providing a user of said user device with single sign-on ability responsive to an indication of an appropriate match between said unique address and said credentials and said authentication information.

18. A computer program product comprising a non-transitory computer useable readable recordable medium having computer useable program code for improving security in a computer network, said computer program product including:

computer useable program code for obtaining operational data for at least a first networked application, wherein said operational data is generated during normal operation of said first networked application;

computer useable program code for obtaining enterprise data for at least a second networked application, wherein said enterprise data is maintained independent of said normal operation of said first networked application;

computer useable program code for correlating said operational data with said enterprise data to obtain correlated data; and computer useable program code for using said correlated data to improve security of said computer network, wherein:

said operational data comprises:

an IP address of a remote party of a connection with said computer network;

and a domain name associated with said IP address;

said enterprise data comprises user registration information maintained by a provider of network connectivity to a remote use of an Internet connection; and said computer program product further includes:

computer useable program code for correlating said operational data with said enterprise data to obtain correlated data by checking that said domain name displayed to a local party of said connection matches said user registration information; and computer useable program code for using said correlated data to improve security of said computer network by displaying an alert to said local party of said connection based on an outcome of said correlating step.

19. A computer program product comprising a non-transitory computer useable readable recordable medium having computer useable program code for improving security in a computer network, said computer program product including:

computer useable program code for obtaining operational data for at least a first networked application, wherein said operational data is generated during normal operation of said first networked application;

computer useable program code for obtaining enterprise data for at least a second networked application, wherein said enterprise data is maintained independent of said normal operation of said first networked application;

computer useable program code for correlating said operational data with said enterprise data to obtain correlated data; and computer useable program code for using said correlated data to improve security of said computer network, wherein:

said operational data comprises:

an IP address of a remote party of a connection with said computer network;

and a domain name associated with said IP address;

said enterprise data comprises user registration information maintained by a provider of network connectivity to said remote party of said connection; and said computer program product further includes:

computer useable program code for correlating said operational data with said enterprise data to obtain correlated data by checking that said domain name displayed to a local party of said connection matches said user registration information; and computer useable program code for using said correlated data to improve security of said computer network by displaying an alert to said local party of said connection based on an outcome of said correlating step.

* * * * *